United States Patent
McLennan et al.

(10) Patent No.: US 7,610,557 B2
(45) Date of Patent: Oct. 27, 2009

(54) AUTOMATIC RESPONSE INTERFACE

(75) Inventors: James McLennan, Romford (GB); Martin Davey, Leighton Buzzard (GB)

(73) Assignee: Thunderhead Limited, Elstree (GB)

( * ) Notice: Subject to any disclaimer, the term of this patent is extended or adjusted under 35 U.S.C. 154(b) by 650 days.

(21) Appl. No.: 10/706,866

(22) Filed: Nov. 12, 2003

(65) Prior Publication Data
US 2005/0081163 A1 Apr. 14, 2005

(51) Int. Cl.
*G06F 3/00* (2006.01)
*G06F 17/00* (2006.01)

(52) U.S. Cl. .................. 715/752; 715/746; 715/273; 715/222

(58) Field of Classification Search .................. None
See application file for complete search history.

(56) References Cited

U.S. PATENT DOCUMENTS

| | | | |
|---|---|---|---|
| 5,535,120 | A | 7/1996 | Chong et al. |
| 5,657,461 | A * | 8/1997 | Harkins et al. .............. 715/733 |
| 5,884,246 | A | 3/1999 | Boucher et al. |
| 5,960,080 | A | 9/1999 | Fahlman et al. |
| 6,009,462 | A | 12/1999 | Birrell et al. |
| 6,104,500 | A * | 8/2000 | Alam et al. ................ 358/1.15 |
| 6,195,094 | B1 * | 2/2001 | Celebiler .................... 715/764 |
| 6,272,482 | B1 | 8/2001 | Ehnebuske et al. |
| 6,438,584 | B1 | 8/2002 | Powers |
| 6,505,236 | B1 | 1/2003 | Pollack |
| 6,826,443 | B2 * | 11/2004 | Makinen .................... 700/121 |
| 7,162,514 | B2 | 1/2007 | Hirai |
| 7,277,951 | B2 | 10/2007 | Marriot et al. |
| 7,409,333 | B2 | 8/2008 | Wilkinson et al. |
| 2002/0042846 | A1 | 4/2002 | Obrador et al. |
| 2003/0146926 | A1 | 8/2003 | Valdes |
| 2003/0158848 | A1 | 8/2003 | Finney |
| 2003/0217109 | A1 * | 11/2003 | Ordille et al. .............. 709/206 |
| 2005/0078658 | A1 | 4/2005 | McLennan et al. |
| 2005/0080643 | A1 | 4/2005 | McLennan et al. |
| 2005/0129191 | A1 * | 6/2005 | Kokko et al. ............. 379/88.13 |

FOREIGN PATENT DOCUMENTS

WO    WO 01/06433 A    1/2001

OTHER PUBLICATIONS

Alta Vista: Babel Fish (http://babelfish.altavista.com).*
Alta Vista: Babel Fish (http://babelfish.altavista.com)—Apr. 15, 2000.*

(Continued)

*Primary Examiner*—Doug Hutton
*Assistant Examiner*—Soumya Dasgupta
(74) *Attorney, Agent, or Firm*—Robert W J Usher

(57) ABSTRACT

A graphical user interface, for use in generating a definition of an automated response mechanism to be used in automatically communicating when a response occasion occurs, comprises screens (272, 282, 288, 316, 322) which present, in two side by side columns (286, 284, 290, 292), a list of selectable items and a list of those items which have been selected, items being transferrable from one column to the other. Selected items are implemented in the automated response. Selectable items include the media (284, 286) for the communication, criteria definitions (310, 320, 312) to be fulfilled or not for an item to be used, fixed (302) text and variable data (304) items in selectable idioms and languages for each medium, and for use when different criteria are fulfilled, and place holders for defining the physical locations in the one or more media responses of items used.

36 Claims, 15 Drawing Sheets

OTHER PUBLICATIONS

"Microsoft Outlook Basics" SLA IT, Jun. 2001 (XP2282435 pp. 9-16, 33 pages, 43, 49-55.

Freed J, "Using Microsoft Outlook A Beginner's Guide Email and Calendars" Sep. 19, 2002 pp. 1-19, XP002302480 The whole document.

"Screen Shots", Lotus Notes 6 Jun. 9, 2003 pp. 1-5, XP002302479 The whole document.

"Lotus notes" (R5) Client calendaring Screen shots, Nov. 2, 2001, XP002302478, the whole document.

Search Report for PCT/GB2004/004282 citing above references, completed Jan. 20, 2005.

* cited by examiner

FIGURE 16

AUTOMATIC RESPONSE INTERFACE

FIELD OF THE INVENTION

The present invention relates to an interface and method for creating and governing the content of automatic responses to be used whenever automated and reasoned communication is to be provided on the basis of requirement or desire.

BACKGROUND OF THE INVENTION

Many businesses require that communication be provided when certain events occur. One such example is the insurance business, where annual renewal notices and offers require to be sent. Another such example lies with the banking business, where communications concerning accounts require to be provided when certain events occur to accounts, such as exceeding overdraft limits. Another example is to be found in Internet trading, where a customer may provide details and requirements to which a response is required. Yet another example is to be found in share, commodities and options trading, where a contract of some kind may be required. Another such example is to be found where a contract is required which has been tailored to individual needs and circumstances.

In other circumstances, it may be required that a plurality of recipients be contacted, for example in an opinion poll, or to receive advertising or any other offer or promotion.

The present invention seeks to provide a method and means whereby such communication can readily be set up and provided.

One communication recipient may prefer one medium of communication, while another communication recipient may prefer another. The present invention seeks to provide ready means to provide communication on whatever medium the recipient prefers.

The exact nature and style of a communication depends upon which medium is being employed. One medium may require a full and formal approach. Another medium may favour an informal approach. The present invention seeks to provide means whereby the message can automatically be styled and selected to suit each medium.

The required language of a message varies from individual communication recipient to individual communication recipient. In Europe, for example, organisations may be required to provide communication in many different languages. The present invention seeks to provide means whereby the language can readily and automatically be matched to the recipient.

The required idiom of a message also varies from individual communication recipient to individual communication recipient. Formal language may be appropriate for some recipients. Informal language may be more appropriate for others. The present invention seeks to provide method and means whereby the idiom of a message can be matched with the appropriate idiom requirements of the individual recipient.

The exact content of a communication can depend upon within which legal jurisdiction a recipient is situated. A contract, acceptable within one territory, may not be acceptable within another. A different set of terms and conditions may be required. One prime example of this situation is to be found in the United States of America, where every State and territory has its own legal code. Another example is to be found within the European Union, where each member state has its own laws and peculiarities. Variation can even occur within a state. The United Kingdom, for example, has separate legal systems in a) England and Wales, b) Scotland and c) Northern Ireland. Added to that, the United Kingdom also has the territories of the Isle of Man and the Channel Islands, which are legally separate and do not even belong to the European Union. Switzerland has all of its separate Cantons. Germany has all of its states and Italy all of its regions. The list is endless and poses a problem which the present invention seeks to overcome with the minimum of inconvenience.

The construction, activation and direction of automated communication messages has been a difficult task, more appropriate, until now, to the Information Technology department of an organisation than to any other. The need for interdepartmental consultation meant that the process was slow, and that the resultant communication process often lacked desirable features. The present invention seeks to provide method and means whereby automated messages can easily, rapidly and comprehensively be created, allowing other more directly involved individuals to take control of the process, and also allowing organisations, too small or specialised to have an Information Technology department, to avail themselves of automated communication.

Automated communication often requires that a standard document needs additions made thereto. One such situation arises where a stock or share trading deal requires to be supported by a contract where certain features must be selected by the trader making the deal. There is a risk of errors or unwanted content creeping in to the completed contract. A similar situation appears where an inexperienced, unqualified or semi-qualified individual is involved with a contract or other document. The present invention seeks to provide a method and means whereby the risk of error and of inclusion of unwanted content is minimised.

SUMMARY OF THE INVENTION

To summarise, the present invention seeks to provide a universally applicable method and means of constructing and conducting automated communication on a plurality of media. According to a first aspect, the present invention consists in a graphic user interface for use in preparation of an automatically generated communication in response to an event requiring generation of a communication, said graphic user interface comprising: means to present an image of a list of one or more selectable operational options; means to accept selection of an operational option for use; means to present an image of the selected operational options as a list of chosen options; and means to implement the chosen options in subsequent generation of the automatically generated communication.

According to a second aspect, the present invention consists in a method for use in preparation of an automatically generated communication in response to an event requiring generation of a communication, the method comprising the steps of: presenting an image of a list of one or more selectable operational options; accepting selection of an operational option for use; presenting an image of the selected operational options as a list of chosen options; and implementing the chosen options in subsequent generation of the automatically generated communication.

The various aspects of the invention further provide for selection of a chosen option and acceptance of return the selected chosen option to the list of selectable operational options.

The various aspects of the invention further provide that the image of a list of one or more selectable operational options and the image of the chosen options can together be presented on a split screen, that the split screen can be operative to display the list of one or more selectable operational options in a first portion thereof and to display the list of chosen options in a second portion thereof, that the first portion of the split screen can be on a first side thereof and that the second portion of the split screen can be on a second side thereof, and that the split screen can be one of a plurality of split screens.

The various aspects of the invention further provide that the list of one or more selectable operational options can be presented as a tree structure.

The various aspects of the invention further provide that the list of selectable options can comprise a list of a plurality of different media whereon the automatically generated communication can be transmitted, that the list of chosen options can comprise one or more chosen media for transmission of the automatically generated communication, that the graphic user interface can accept selection of the one or more chosen media and, in subsequent operation, can direct the automatically generated communication for transmission on the one or more chosen media.

The various aspects of the invention further provide that the list of one or more selectable operational options can comprises at least one of: one or more criteria to be fulfilled to cause the generation of the automatically generated communication; one or more criteria to be fulfilled to select a text item; one or more text items to be selected; and one or more fixed items to be selected.

The various aspects of the invention further provide for criterion language conversion by acceptance of a criterion definition for each of the one or more criteria and conversion of the criterion definition into plain language for display.

The various aspects of the invention further provide that the one or more text items can comprise items in a plurality of selectable languages, that the one or more text items can comprise items for use in one or more selectable idioms, that the one or more text items can comprise items for use in one or more selectable media.

The various aspects of the invention further provide that the one or more fixed items can comprise one or more selectable place holders for use with one or more media, that the one or more fixed items can comprise one or more selectable place holders for use in fixing the position of items with one or more media, and that the one or more fixed items can comprise one or more selectable graphic items for use with one or more media.

The various aspects of the invention further allow for testing the specified automatically generated communication by presenting different criteria for generation of an automatically generated communication, and alteration the specification of the automatically generated communication until satisfactory automatically generated communications are obtained.

BRIEF DESCRIPTION OF THE DRAWINGS

The invention is further explained, by way of an example, by the following description, read in conjunction with the appended drawings, in which:

FIG. 16 shows a third screen presented to the compiler of the automated response template as the compiler prepares the automated response template.

And

Figure 18:

FIG. 18 shows a fifth screen, showing further material which can be added if a further criterion definition is met.

PARTICULAR DESCRIPTION

Figure 1:
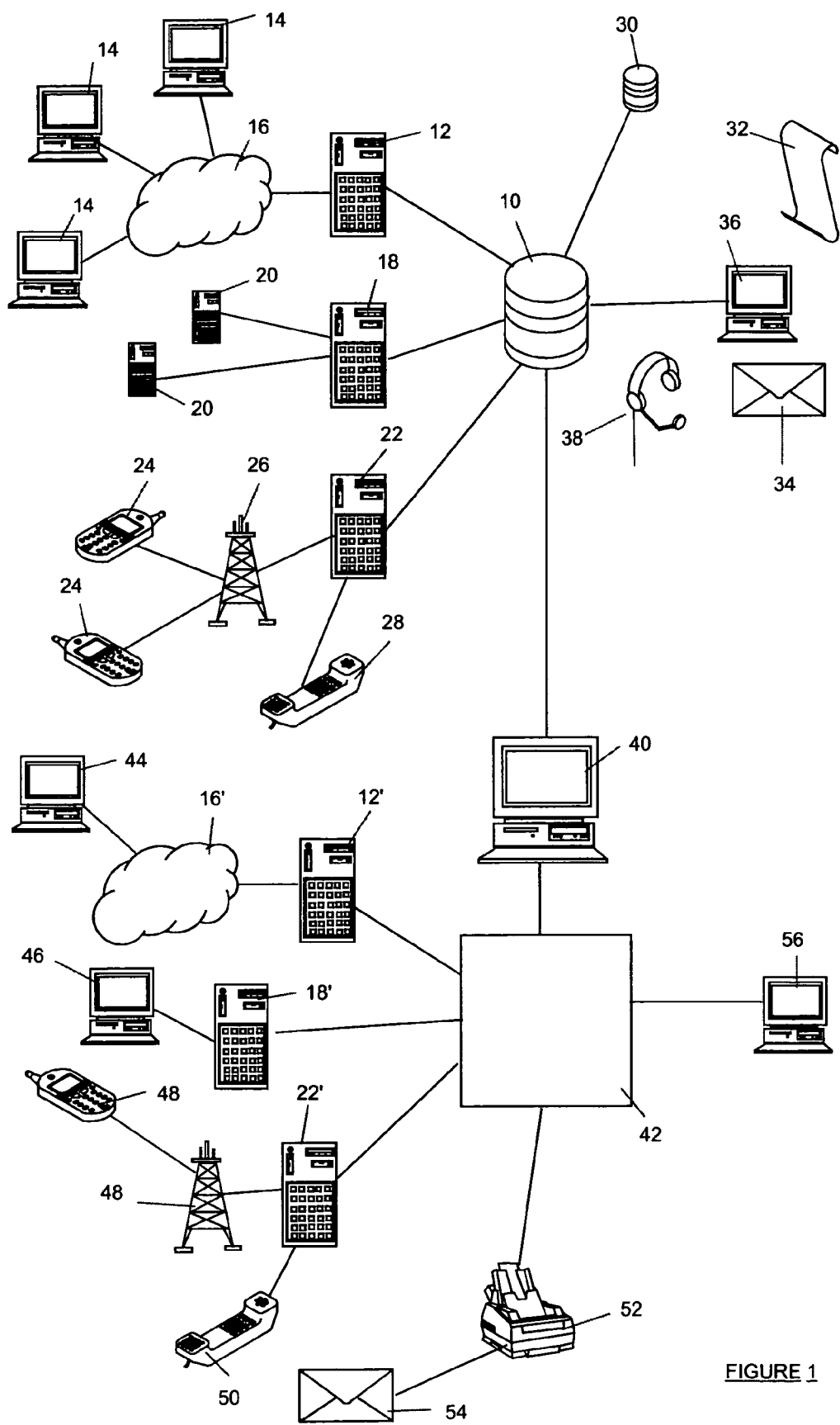
FIG. 1 shows a schematic view of a non-restrictive example of the type of environment where the present invention can be applied.

Attention is first drawn to FIG. 1 showing a schematic view of the type of environment where the present invention can be applied.

A data store 10 can receive data from various sources. The data store 10 can receive written data from an Internet server 12 which derives data from Internet client 14 connected to the data store through the Internet 16. The sort of data which may be derived by the data store 10 from the Internet server 12 could be, as a set of non-restrictive examples, biographical or financial data filled in on a form, credit card numbers, birthdays, details of children and relatives, details of nationality, names and addresses, bids at auction, and so on.

The data derived from the Internet server 12 will be any data for which some kind of response is required.

The data store 10 can also receive data from a branch server 18 which communicates with remote servers 20 which can be situated in remote locations. An example of such remote servers would be, for example, servers connected with the individual branches of a bank, store or insurance company.

Once again, the branch server 18 provides the data store 10 with data to which some kind of response should be generated.

The data store 10 can also receive data from a telephone server 22 operative to receive text messages from mobile telephones 24 coupled to the telephone server 22 by means of radio mast 26. The telephone server 22 is also coupled to communicate with landline telephones 28. While the telephone server 22 is here described as handling text messages, it is to be appreciated that telephones 24, 28 are becoming progressively more sophisticated and can pass messages in many different forms of code. The present invention encompasses the ability of telephones 24, 28 to pass messages in any of the many forms of code which have become possible and which will become possible. The present invention also encompasses the possibility that automatic computerised voice decoding can be used to decode voice messages into a form usable by the data store 10.

The data store 10 can also receive data from other data sources 30. Other data sources 30 can be, for example, demographic and biographic data concerning individuals, their families and associations. A very good example of such data is to be found in the United Kingdom where copies of telephone directories or voters' registers, complete with addresses, can be purchased.

The data store 10 can also receive data from written communications 32 or mail 34 which can be entered by an operator at an input console 36. Equally, the operator at the input console 36 can input data to the data store from conversation via a telephone line 38.

The data store 10 is accessed by a processor 40 which supervises a communications package 42. The communications package 42 provides communications, according to the details of the data store 10, for individuals in the mode that the individual prefers. The communications package 42 can send a message to a recipient via the recipient's personal computer 44 connected to the Internet 16' through an Internet server 12'. Equally, the communications package 42 can send a message to a recipient processor 46 via a branch server 18'. Likewise, the communications package 42 can communicate via the telephone server 22' to deliver text or voice messages to a recipient mobile telephone 48 or a recipient landline telephone 50. The message sent from the communications package 42 can be a text message, or can be a voice message encoded by a voice encoder.

The communications package 42 may also send text material to a printer 52 which creates mail 54 to be posted to a message recipient.

Optionally, in some circumstances, the whole of a message cannot be compiled automatically by the communications package 42 and, for example where a contract must have terms inserted, must be modified and the correct terms provided before the communications package 42 can release the message for sending to the recipient. This is done by means of one or more modifying consoles 56. The nearly complete message is sent to the modifying console 56 which inserts the necessary terms and sends the message back to the communications package 42 for completion of the transmission process.

The arrangement, shown in FIG. 1, is applicable to virtually any process where an organisation is required to respond to an approach or an event. The arrangement shown in FIG. 1 can automatically process orders received from customers, can send out reminders and renewals for insurance companies, can provide balance sensitive information (such as overdraft warnings) to bank clients, can remind people that they are due for medical treatment, court appearances and a host of other things. The versatility and utility of the invention will become apparent as the preferred embodiment is described with respect to FIG. 1 and the subsequent drawings.

The documents, created using the preferred embodiment of the invention, for preference use XML (extensible Markup Language), which is a widely used system for defining data formats. XML provides a very rich system to define complex documents and data structures such as letters, invoices, molecular data, news feeds, glossaries, inventory descriptions, real estate properties, and so on. As long as a programmer has the XML definition for a collection of data (often called a "schema") then they can create a program to reliably process any data formatted according to those rules. The invention is not limited to using XML, and can use any language, languages, program or programs, scheme or schemes whereby a document can be assembled according to the activities hereinbefore and hereinafter described for the present invention.

The preferred embodiment of the present invention is described in terms of a letter-writing routine used, just for this example, in an insurance renewal situation. However, it is to be appreciated that the preferred embodiment of the invention can also encompass all of the uses and possibilities hereinbefore described.

Figure 2:
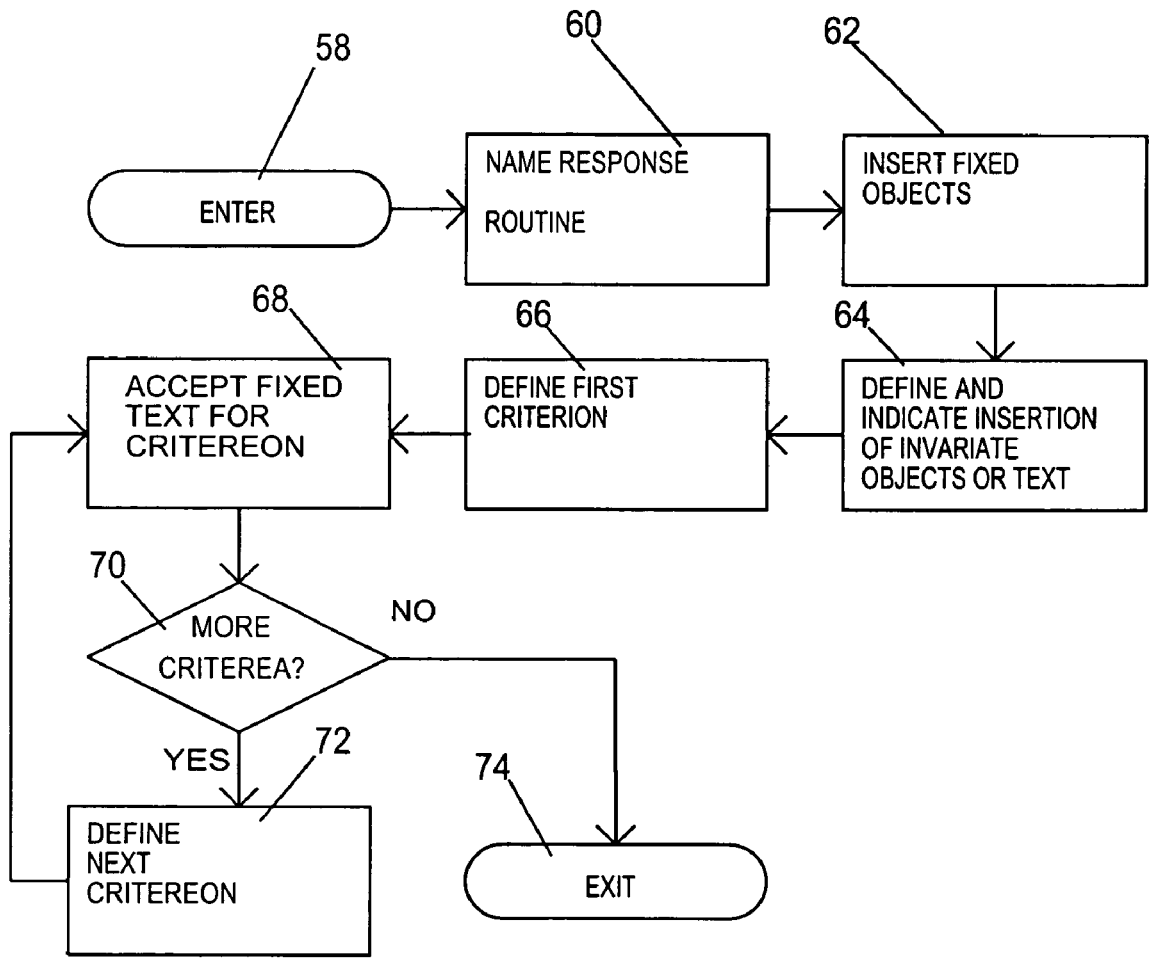
FIG. 2 is a flow chart which shows the process involved in creating a response routine.

Attention is next drawn to FIG. 2 which shows the process involved in creating a response routine.

FIG. 2 shows how, simply by way of the example of the preferred embodiment, an individual might make up an automatic routine.

From entry 58 a first operation 60 prompts the compiler to provide a name for the automatic response routine. Thereafter, a second operation 62 has the compiler insert fixed objects to be printed upon the page. Such fixed objects may be images of banners, and other elements of letterhead.

A third operation 64 then has the compiler define and indicate the points of insertion of invariate objects or text. Such invariate objects may be, in this instance, the name and address of the recipient or recipients, the number or numbers of insurance policies, the renewal date and so on. The invariate objects or text can also include pictures of individuals and so on.

Having set up the basic layout of the letter or communication, a fourth operation 66 prompts the compiler to provide a definition of a first criterion for selecting a body of text to be inserted into the letter. The criterion is assembled, as will be explained at a later point, according to a plain language logic statement. The first criterion could be that an insurance policy is due for renewal within the next month.

A fifth operation 68, once the first criterion has been defined, accepts the fixed text which is to be inserted into the letter should the first criterion be fulfilled. The fixed text can also include other printable or representable material such as images, advertising banners and the like.

If a first test 70 detects an indication from the compiler that more criteria are to be accommodated by the response, a sixth operation 72 has the compiler define the next criterion and return control to the fifth operation 68. If the first test detects that no more criteria are to be accommodated, control passes to exit 74.

FIG. 2 thus describes how a document can be assembled with different criteria prompting different contents.

Once the automatic response routine has been created, according to FIG. 2, it can be stored for later use, or sent elsewhere for use. The automatic response routine also contains within itself means to implement its provisions, including, but not limited to, interface and instruction routines operative to control the various types of equipment shown in FIG. 1.

Figure 3:
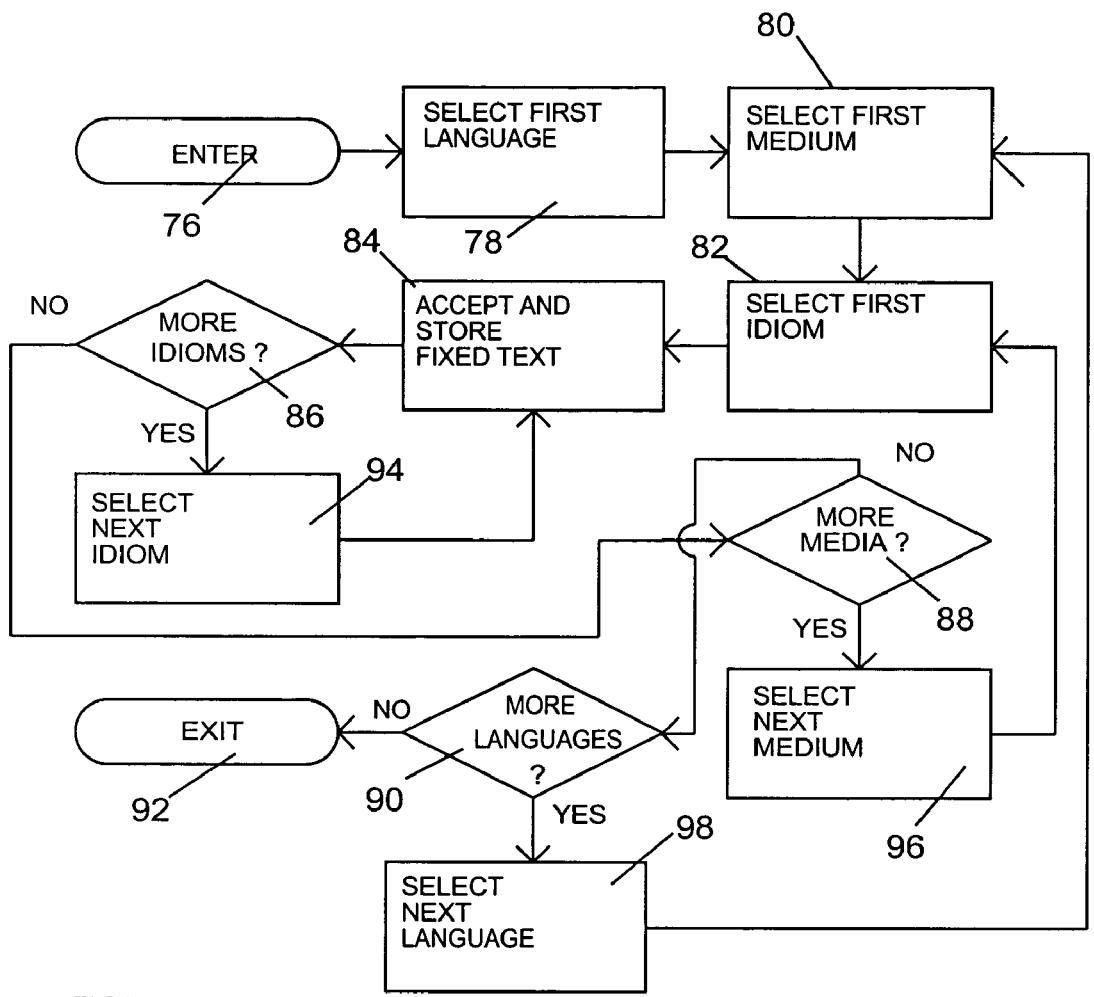
FIG. 3 is a flow chart showing one example of how the acceptance of fixed text for a criterion, otherwise shown in FIG. 2, can be used to provide varied options of fixed text to enhance the flexibility of the automatic response allowed by the present invention.

Attention is next drawn to FIG. 3 which is a flow chart showing one example of how the fifth operation 68 of FIG. 2 can be used to provide varied options of fixed text to enhance the flexibility of the automatic response allowed by the present invention.

From entry 76 a seventh operation 78 has the compiler select a first language in which a response is to be couched. An eighth operation 80 then has the compiler select a first medium by which the response is to be provided. A ninth operation 82 then has the compiler select which idiom is to be used.

By means of the seventh 78, eighth 80 and ninth 82 operations the compiler can select a language, a type of medium which is to bear the message, and a first idiom (either severe, moderate or friendly and so on).

As will be explained later, the compiler can also use the flow chart of FIG. 3 to select a one or more jurisdictions, each requiring different text, to which a particular fixed response is to be addressed.

Once these criteria have been selected, a tenth operation 84 then has the compiler provide the fixed text which is to be used should the particular criterion of FIG. 2 be met. The compiler types in, pastes in, or provides the text by any other means. The compiler can also edit the fixed text. The text is only fixed when the response routine is responding to stimuli.

Having accepted the fixed text, a second test 86 prompts the compiler to see if there are any further idioms required for that medium and that language. If not, a third test 88 looks to see if there are any more media which are to be accommodated in that language and for that idiom. If not, a fourth test 90 looks to see if any more languages are to be provided. If no more than one language is to be provided, control passes to exit 92.

If the second test 86 detects that the compiler requires further idioms to be provided, an eleventh operation 94 prompts the compiler to select the next idiom and passes control back to the tenth operation 84 to accept and store the fixed text in the next selected idiom.

If the third test 88 detects that more media are to be accommodated in that language and for that criterion, control passes from the third test 88 to a twelfth operation 96 which looks for the compiler to select the next medium and then passes control to the ninth operation 82 which looks for the selection of a first idiom for that medium and carries on as before.

If the fourth test 90 detects that more languages are to be used, a thirteenth operation 98 has the compiler select a next language and then passes control to the eighth operation 80 awaiting selection of the first medium which will be accommodated in the further language.

By the process of FIG. 3, a plurality of different fixed messages are made available for use in an automatic response, suitable for use with a plurality of media and in a plurality of languages.

Moving ahead, perhaps, a little, a language can be selected for an automatic response on the basis of a postal code, an idiom on the basis of a geographical area, and a medium on the basis of a data flag held within the data relating to the individual in the data store 10.

Figure 4:
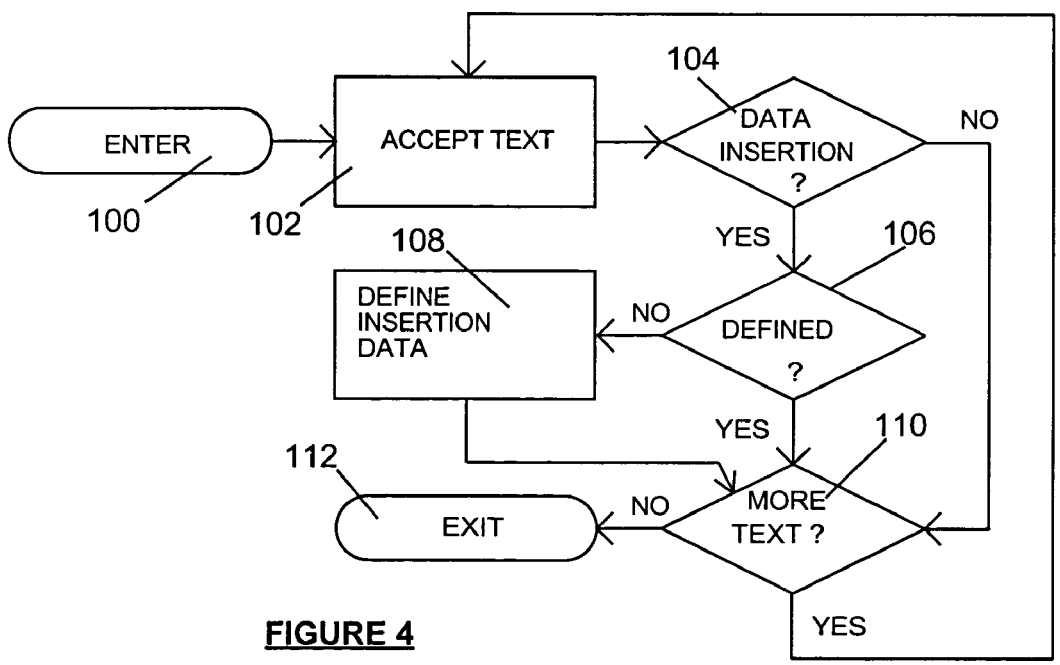
FIG. 4 is a flow chart giving an example of just one way in which the acceptance and storage of fixed text, otherwise shown in FIG. 3, can be accomplished.

Attention is next drawn to FIG. 4, a flow chart giving an example of just one way in which the tenth operation 84 of FIG. 3 can be accomplished.

From entry 100 a fourteenth operation 102 accepts the fixed text characters provided by the compiler. A fifth test 104 looks to see if an item of data is to be inserted into the midst of the fixed text. Such an item of data insertion might be the individual name of the recipient, the insurance policy number (as an example), the date of renewal of the insurance policy and so on.

If the fifth test 104 finds that data is to be inserted, that data being defined by words contained within brackets, control passes to a sixth test 106 which looks to see if the data item has been defined. The compiler is required to define the data item so that it may be retrieved from the data store for insertion. If the data item has not been defined, the sixth test 106 passes control to a fifteenth operation 108 which accepts the definition of the undefined data for insertion from the compiler. Control then passes to a seventh test 110.

Another option is for a data item to be externally defined when required. The data item is re-defined in a "building" stage using a building module, and then re-attached to the response template.

If the sixth test 106 discovers that the data to be inserted has already been defined, control also passes from the sixth test 106 to the seventh test 110.

The seventh test 110 looks to see if more text is to be provided for inclusion in the fixed text item. If yes, the seventh test 110 passes control back to the fourteenth operation 102. If not, the seventh test 110 passes control to exit 112.

The functioning of FIG. 4 shows how a fixed text response item can be assembled including insertion of relevant data to that text.

Figure 5:
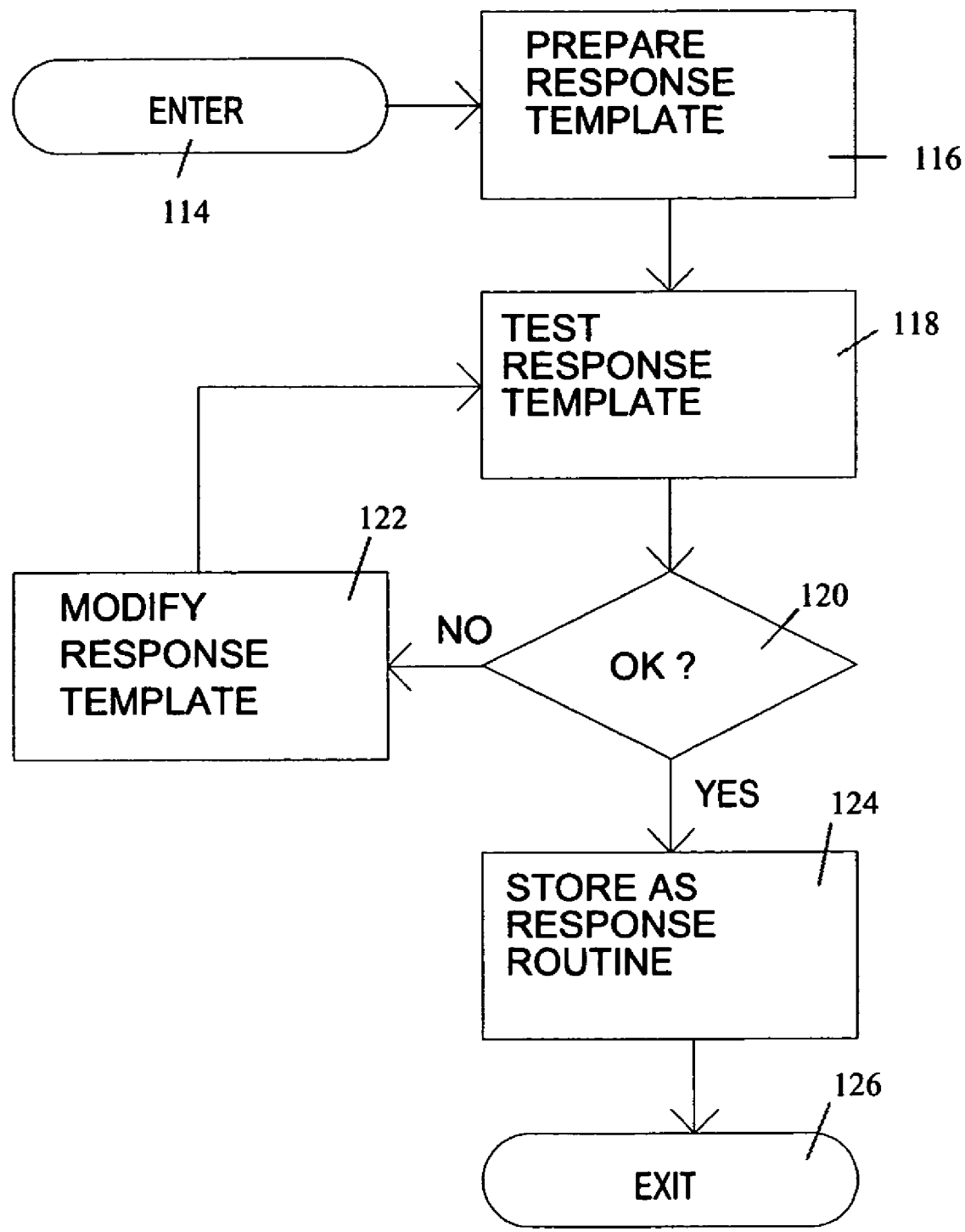
FIG. 5 is a flow chart showing how the human compiler completes the task of preparing an automatic response.

Attention is next drawn to FIG. 5 showing how the compiler completes the task of preparing an automatic response. From entry 114 a sixteenth operation 116 has the compiler prepare a response template. The sixteenth operation 116 is described, in much greater detail, in FIG. 2, FIG. 3 and FIG. 4.

Having prepared a prototype response template a seventeenth operation 118 allows the compiler to test the response template against trial data.

If an eighth test 120 finds that the compiler is dissatisfied with the automated response template an eighteenth operation 122 allows the compiler to modify the automated response template, passing control back to the seventeenth operation 118 for further testing.

Once the compiler is content that the automated response template is acceptable, the eighteenth operation 120 passes control to an nineteenth operation 124, and stores the prepared response template as a response routine which can be called up and used at any time. Control then passes to exit 126.

The processes shown in FIG. 5 allow the compiler to fine tune the automated response template until it performs as required.

Figure 6:
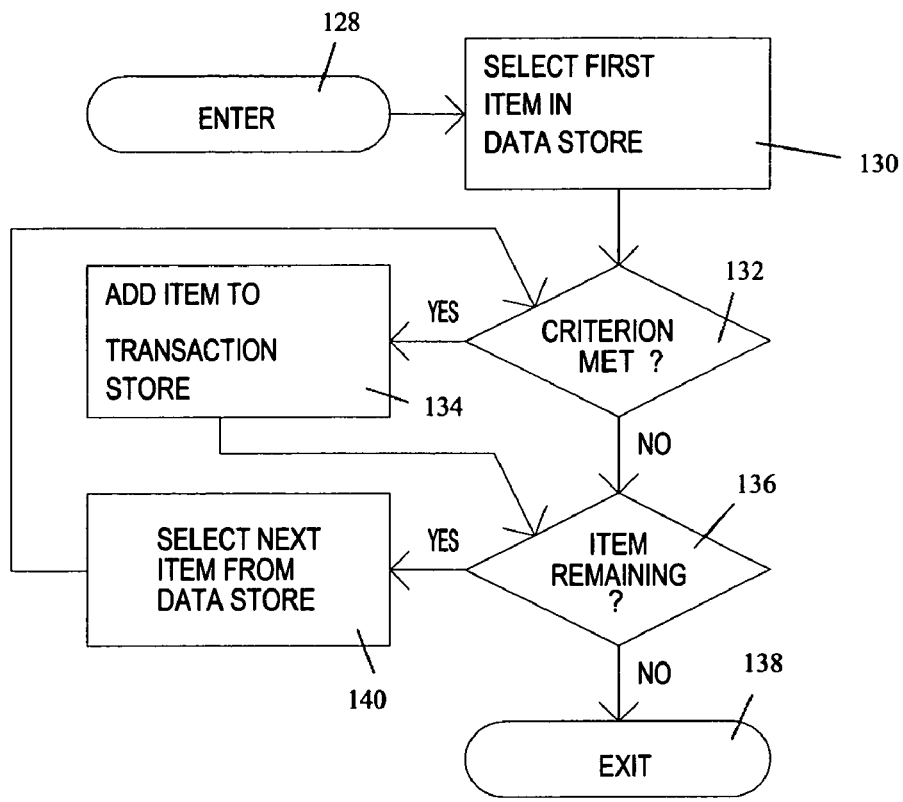
FIG. 6 is a flow chart showing how the present invention is used to provide an automated response.

Attention is next drawn to FIG. 6, showing a flow chart of how the present invention is used to provide an automated response.

From entry 128 a twentieth operation 130 interrogates the data store 10 and selects the first item therein. A ninth test 132 then checks to see if the first item accessed from the data store 10 meets the criterion for inclusion in providing an automated response. If the ninth test 132 detects that the criterion for an automated response is met, a twenty-first operation 134 adds the selected item in the data store to a transaction store ready for processing. The twenty-first operation 134 then passes control to a tenth test 136. If the ninth test 132 detects that the particular selected item from the data store 10 does not meet the criterion, the ninth test 132 also passes control directly to the tenth test 136.

If the tenth test 136 detects that no item is remaining in the data store 10 for testing whether it passes the criterion for automated processing on this occasion, the tenth test 136 passes control to exit 138. If the tenth test 136 detects that there are items remaining to be tested for processing criterion in the data store 10, it passes control to a twenty-second operation 140 which selects the next item from the data store 10 and passes control back to the ninth test 132.

The processes described in FIG. 6 show how items from the data store 10 are selectively passed to a transaction store for automated processing.

Figure 7:
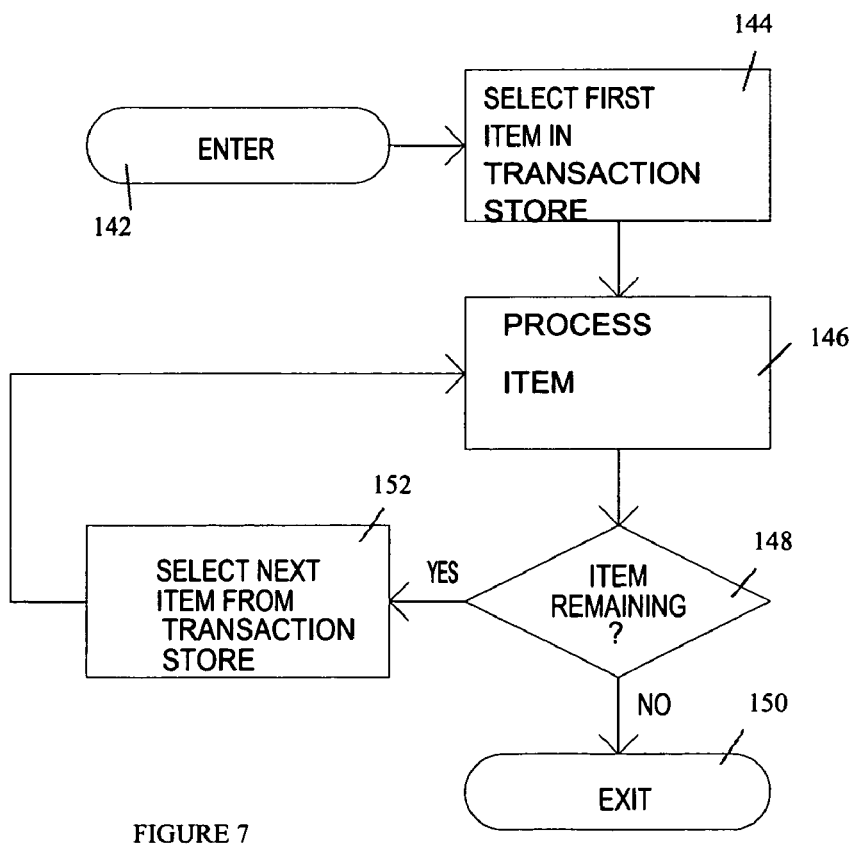
FIG. 7 is a flow chart showing how an automated response run is conducted, using the present invention.

Attention is next drawn to FIG. 7 which shows a flow chart of how an automated response run is conducted, using the present invention.

From entry 142 a twenty-third operation 144 selects the first item in the transaction store and passes control to a twenty-fourth operation 146 which processes that item to provide a unique response in an automated fashion for that item.

An eleventh test 148 then looks to see if any item is remaining in the transaction store unprocessed. If not, control passes to exit 150.

If the eleventh test 148 detects that a further item is still in the transaction store unprocessed, control is passed to a twenty-fifth operation 152 which selects the next item from the transaction store and passes control to the twenty-fourth operation 146 for that next item to be processed.

By the process depicted in FIG. 7, all of the items in the data store 10 which are due to be the subject of an automated response, on this occasion, are responded to one by one.

Figure 8:
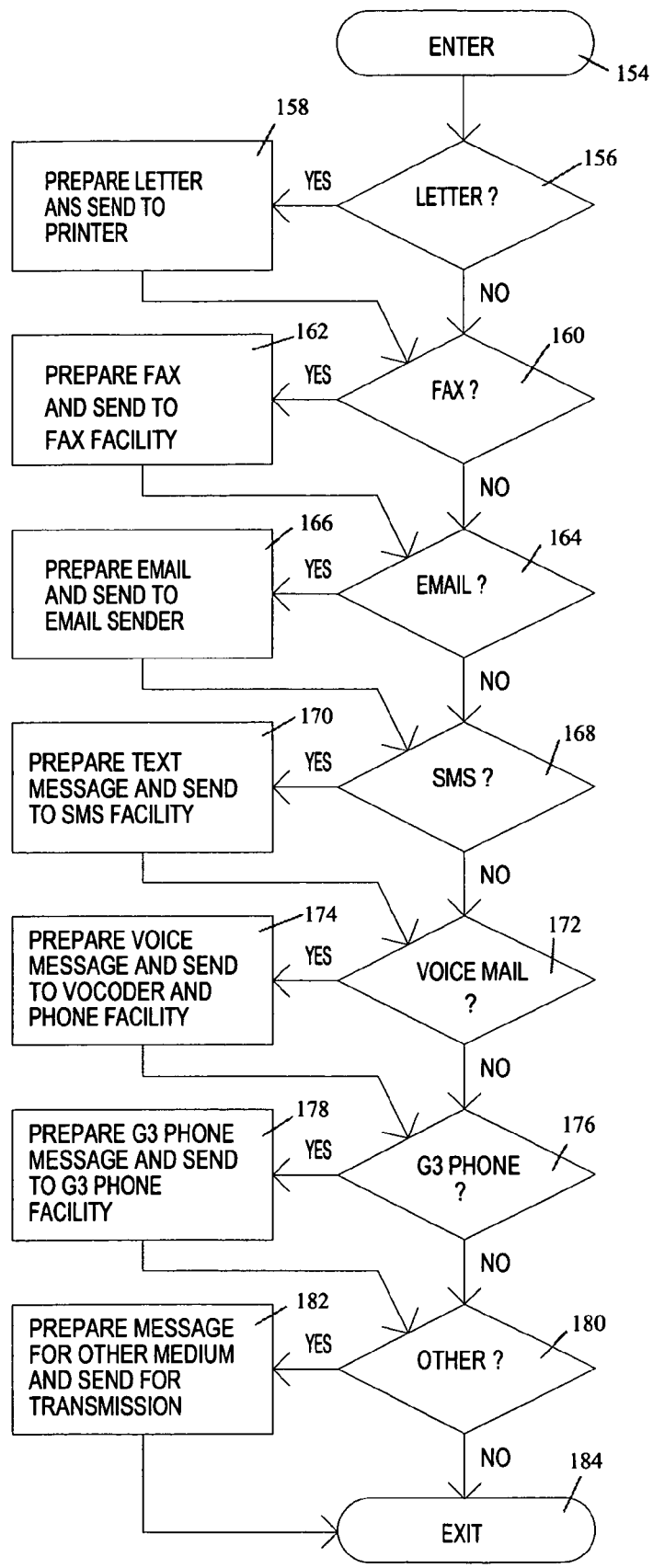
FIG. 8 is a flow chart showing a first stage in the preparation of an automated response.

Attention is next drawn to FIG. 8, showing a flow chart indicating a first stage in the preparation of an automated response.

From entry 154 a twelfth test 156 looks to see if a flag in the data held in the data store 10 indicates that a letter is required in the automated response. If so, a twenty-sixth operation 158 prepares the letter and sends the letter to be printed and posted.

Control then passes to a thirteenth test 160 which looks to see if a facsimile communication is required in the automated response routine. If so, a twenty-seventh operation 162 prepares an appropriate response for sending by facsimile and sends the response to a facsimile sending facility.

Control then passes to a fourteenth test 164 which determines whether or not an email is required in the automated response routine. If so, a twenty-eighth operation 166 prepares a response suitable for transmission by email and sends that response to the email sender or server to be sent to the recipient.

Control then passes to a fifteenth test 168 which checks to see if a text message (short message service message) response is required to be sent to the recipient of the automated response. If so, a twenty-ninth operation 170 prepares a suitable SMS text message and sends the text message to a sending facility to be sent to the recipient.

Control then passes to a sixteenth test 172 which checks to see if a voice mail response is to be provided to the recipient. If so, a thirtieth operation 174 prepares a text message suitable for creating a voice mail, and sends that text message to a voice encoder which converts the text for speech. The speech is then sent to a telephone facility for transmission to the recipient.

Control then passes to a seventeenth test 176 which looks to see if a message, suitable for transmission on a Group 3 video telephone is to be provided for the recipient of the automated response. If so, a thirty-first operation 178 assembles a response including text and images, and possibly voice or sound, which is assembled and sent to a Group 3 telephone message transmission facility.

Control then passes to an eighteenth test 180 which is here designated as looking to see if any other medium is to be employed to provide communication with the recipient of the automated response. The other media are any media whatsoever that can be automatically employed to communicate with the recipient if so required. The present invention encompasses using any other medium which can be employed. If the eighteenth test 180 detects that some other medium is required, a thirty-second operation 182 will prepare a suitable response for use with the other medium and send that response for transmission.

Control then passes to exit 184.

By the processes illustrated in FIG. 8, a response can be prepared for one, some or all of the different media described. The invention encompasses using a smaller set of different media from those shown in FIG. 8, and also comprises using a larger set than that shown.

Figure 9:
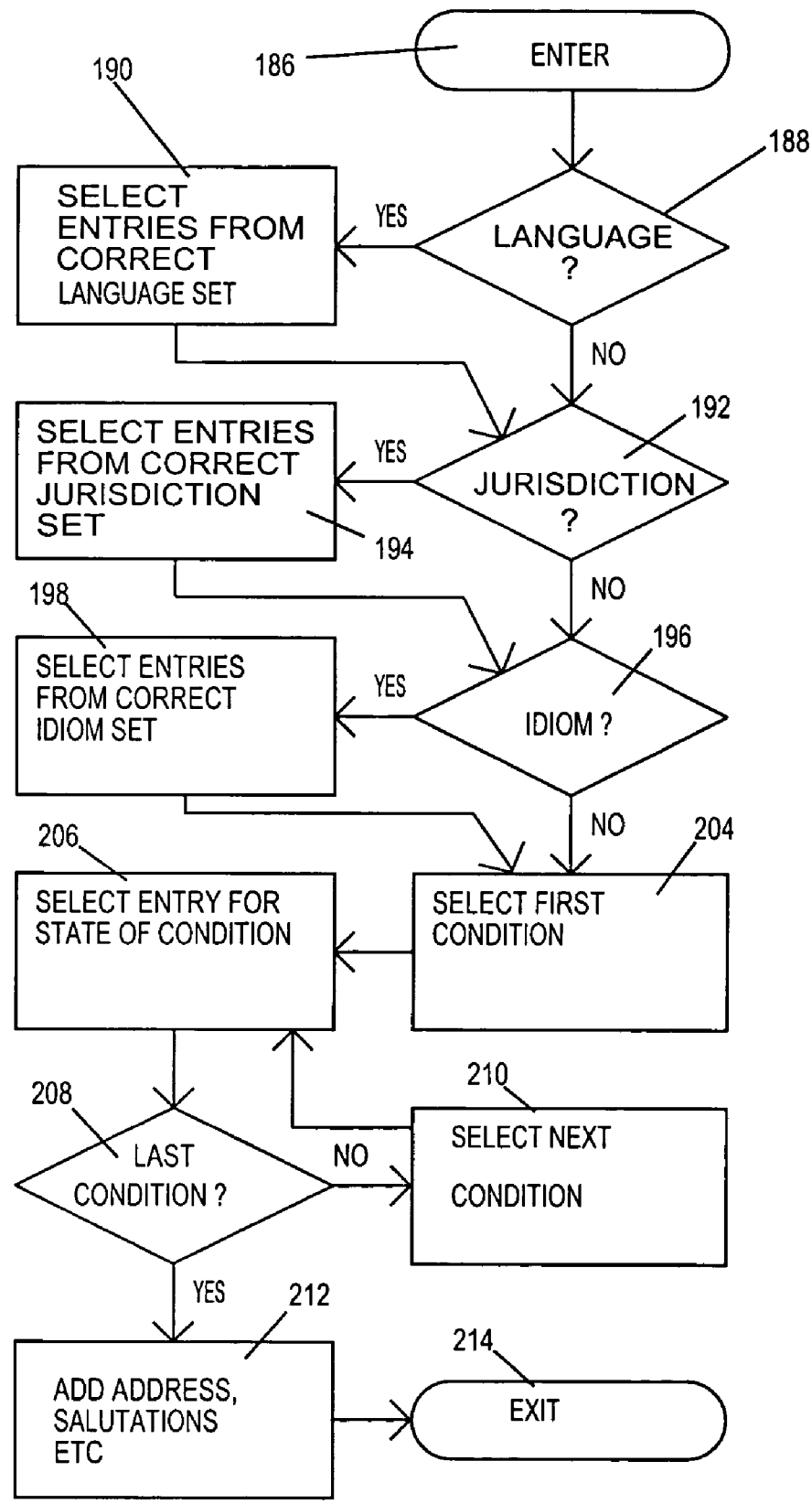
FIG. 9 is a flow chart which shows, by way of example, the way in which a message is prepared for sending to each of the different media, as shown in FIG. 8.

Attention is next drawn to FIG. 9 which shows, by way of example, the way in which a message is prepared in FIG. 8 in the twenty-sixth operation 158, the twenty-seventh operation 162, the twenty-eighth operation 166, the twenty-ninth operation 170, the thirtieth operation 174, the thirty-first operation 178 and the thirty-second operation 182.

From entry 186 a nineteenth test 188 checks to see which language is to be used in the automated response. The language may be indicated by the postal code of the address of the recipient, by the name of the town where the recipient lives, by a flag included in the data held for that recipient in the data store 10, or by any other convenient means. If a choice of languages is provided, a thirty-third operation 190 causes the fixed content elements of the automated response to be chosen from the appropriate language set.

A twentieth test 192 then checks to see which jurisdiction the recipient of the automated response occupies. Once again, the jurisdiction can be derived from the postal code of the recipient, the name of the town or state of the recipient, or by some flag held in the data in the data store 10 relating to that recipient. If a particular jurisdiction and choice of jurisdiction is indicated, a thirty-fourth operation 194 makes sure that the fixed content responses in the automated response are selected only from those entries which relate to the chosen jurisdiction.

Control then passes to a twenty-first test 196 which looks to see if any particular idiom is to be used for the automated response. The idiom may be indicated by the name of the town inhabited by the recipient, by a flag held in the data in the data store 10, or by any other means. If a particular choice of idiom is provided and is to be selected, a thirty-fifth operation 198 ensures that the entries made in the response are chosen from the fixed content entries in the appropriate idiom.

Control then passes to a thirty-seventh operation 204 then selects the first condition which is to be used to select an appropriate entry in the automated response. Such a first condition could be, simply by way of example, that an insurance premium is due to be renewed within the next month. Another such condition could be that the recipient has failed to renew an insurance premium in due time. All sorts of different reasons and conditions can be encompassed within the present invention for selecting a particular one of a plurality of fixed responses.

Control then passes to a thirty-eighth operation 206 which selects the particular fixed content entry to the automated response which is appropriate for the state of the particular condition under scrutiny. For example, an individual may have been turned down for insurance, or accepted for insurance. One or other appropriate responses will be selected.

A twenty-third test 208 then looks to see if any text insertion conditions remain. If it is not the last condition, a thirty-ninth operation 210 selects the next condition to be used for determining the fixed content entry to be inserted into the response, and passes control back to the thirty-eighth operation 206 to select the next entry.

If the twenty-third test 208 detects that the last condition has been processed, a fortieth operation 212 adds such elements as images, banners and fixed data to the automated response and passes control to exit 214.

The processes described in FIG. 9 can be conducted in different orders from that shown, and can include one, some or all of the different variations 188, 192, 196, 200 indicated. The invention also allows for further variations, such as selection of colours, type face, accents for sound messages, and so on, not otherwise shown in FIG. 9. The fixed content provided in the fortieth operation 212 can be added at the beginning of the compilation of the automated response, or during the different stages of the compilation of the automated response, other than that shown in FIG. 9.

Figure 10:
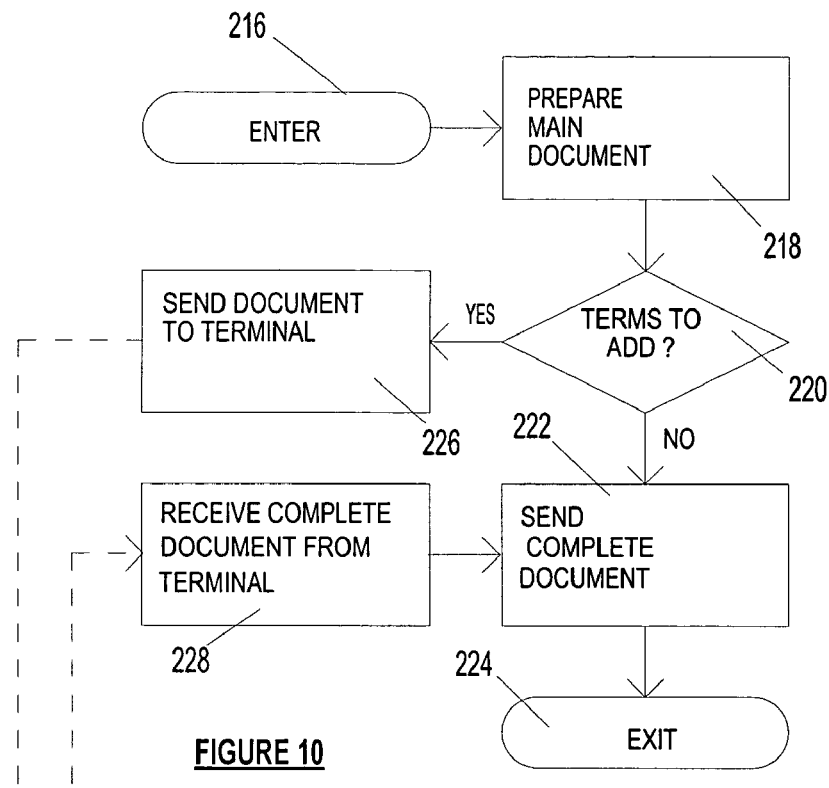
FIG. 10 is a flow chart showing what happens when an automatically prepared document requires to have alterations made to it under the supervision of an involved human operator who knows the probably complex variations required.

Attention is next drawn to FIG. 10 which is a flow chart showing what happens when an automatically prepared document requires to have alterations made to it under the supervision of an involved human operator who knows the probably complex variations required. FIG. 10 shows the operation of one type of alteration means, used to alter the fixed content of a response for transmission.

From entry 216 a forty-first operation 218 has the main document prepared according to the activities illustrated, by way of example, in FIGS. 8 and 9. A twenty-fourth test 220 then looks to see if human intervention of add terms is required. If not, a forty-second operation 222 sends the completed document for transmission to the recipient, and passes control to exit 224.

If the twenty-fourth test 220 detects that further terms require to be added, a forty-third operation 226 sends the document to the modifying console 56 otherwise shown in FIG. 1 for the operator to select and add the appropriate terms. When modified, a forty-fourth operation 228 accepts the completed document from the modifying console 56 and passes control to the forty-second operation 222 to send the complete document to the recipient.

Figure 11:
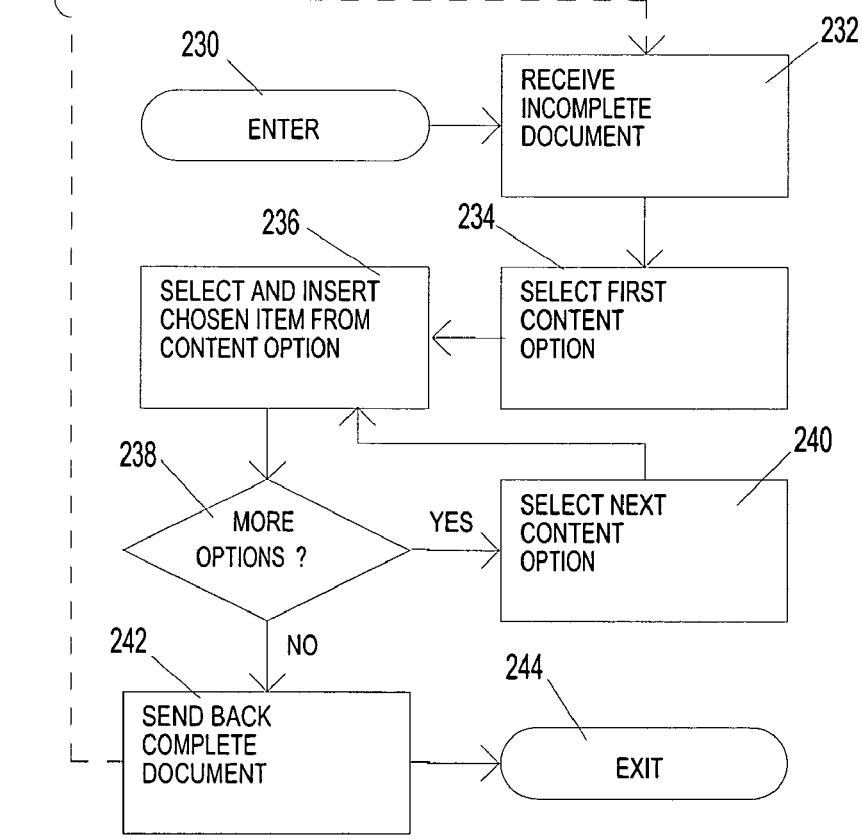
FIG. 11 is a flow chart illustrating the behaviour of the modifying console when employed by the processes shown in FIG. 10.

Attention is next drawn to FIG. 11 illustrating the behaviour of the modifying console 56 when employed by the processes shown in FIG. 10.

From entry 230 a forty-fifth operation 232 accepts the incomplete document from the forty-third operation 226 of FIG. 10 and a forty-sixth operation 234 selects the first option, on the semi-complete document, where the human operator of the modifying console 56 can select one or none of a plurality of fixed content inserts. A forty-seventh operation 236 then allows the human operator of the modifying console 56 to select one, none or some of the particular fixed content insert provided for that purpose. The fixed content textural inserts are provided by the processor 40 and cannot be changed by the human operator of the modifying console 56, merely inserted.

In another alternative, the human operator can also add new content, or, if pre-defined conditions allow, can amend selected content.

A twenty-fifth test 238 then looks to see if any more options exist in the semi-complete document for the operator of the modifying console 56 to select none, one or some of the fixed value content elements for that particular option. If so, a forty-eighth operation 240 selects the text content option location and passes control back to the forty-seventh operation 236 for the fixed content element to be selected and inserted (or not) for that option.

If the twenty-fifth test 238 detects that no further content options exist, a forty-ninth operation sends the now complete document back to the forty-fourth operation 228 of FIG. 10 for transmission to the recipient, and passes control to exit 244.

Figure 12:
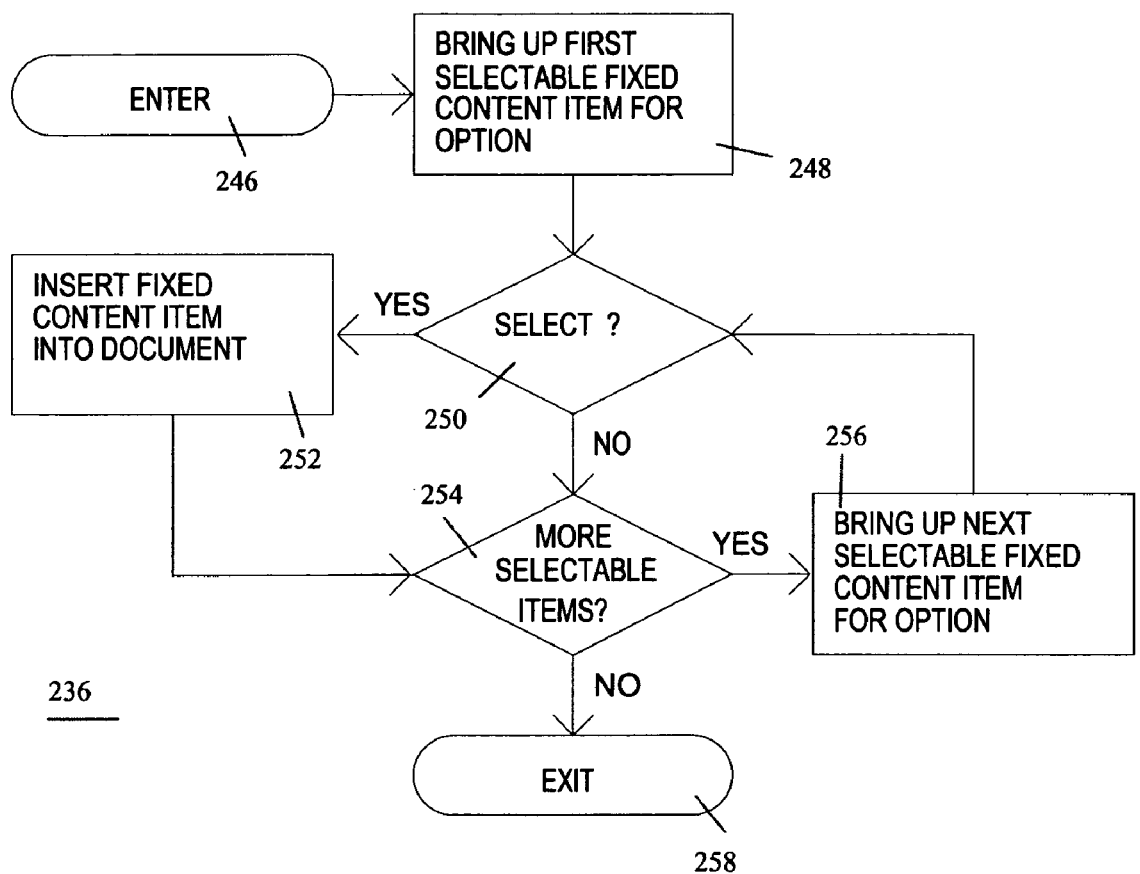
FIG. 12 is a flow chart showing one way in which the operator of the modifying console may be prompted and assisted to select and insert the chosen item from the content option, otherwise shown in FIG. 11.

Attention is next drawn to FIG. 12 which is a flow chart showing one way in which the operator of the modifying console 56 may be prompted and assisted to perform the forty-seventh operation 236 otherwise shown in FIG. 11.

From entry 246 a fiftieth operation 248 has the modifying console 56 bring up and show to the operator the first selectable fixed content item appropriate to the content option being addressed. A twenty-sixth test 250 then looks to see whether the operator of the modifying console 56 selects that particular item. If so, a fifty-first operation 252 inserts the selected fixed content item into the document. The fifty-first operation 252 passes control to a twenty-seventh test 254 which looks to see if there are more selectable items for insertion in response to the particular content option being addressed. The twenty-sixth test 250, if the particular item being displayed is not selected, also passes control to the twenty-seventh test 254.

If the twenty-seventh test 254 detects that there are further fixed content items appropriate for selection for the particular content option being addressed, a fifty-second operation 256 brings up the next selectable fixed content item for the particular option being addressed and causes the modifying console 56 to display that item. The fifty-second operation 256 then passes control to the twenty-sixth test 250 to see if the operator of the modifying console 56 wishes to select that fixed content item for inclusion in the document.

If the twenty-seventh test 254 detects that there are no more selectable items, control passes to exit 258.

The different selectable fixed content items, described in relation to FIG. 12 as being displayed one by one, can, as an alternative, be displayed together and be selected. Likewise, the fixed content options for all of the different content options can be displayed together and also selected.

The operations shown in all of FIGS. 2-12 have been shown and described as occurring in a particular order. The present invention allows that the operations can be performed in other orders than those shown, and can be displayed and selected, processed or added to by an operator using a graphic user interface.

Figure 13:
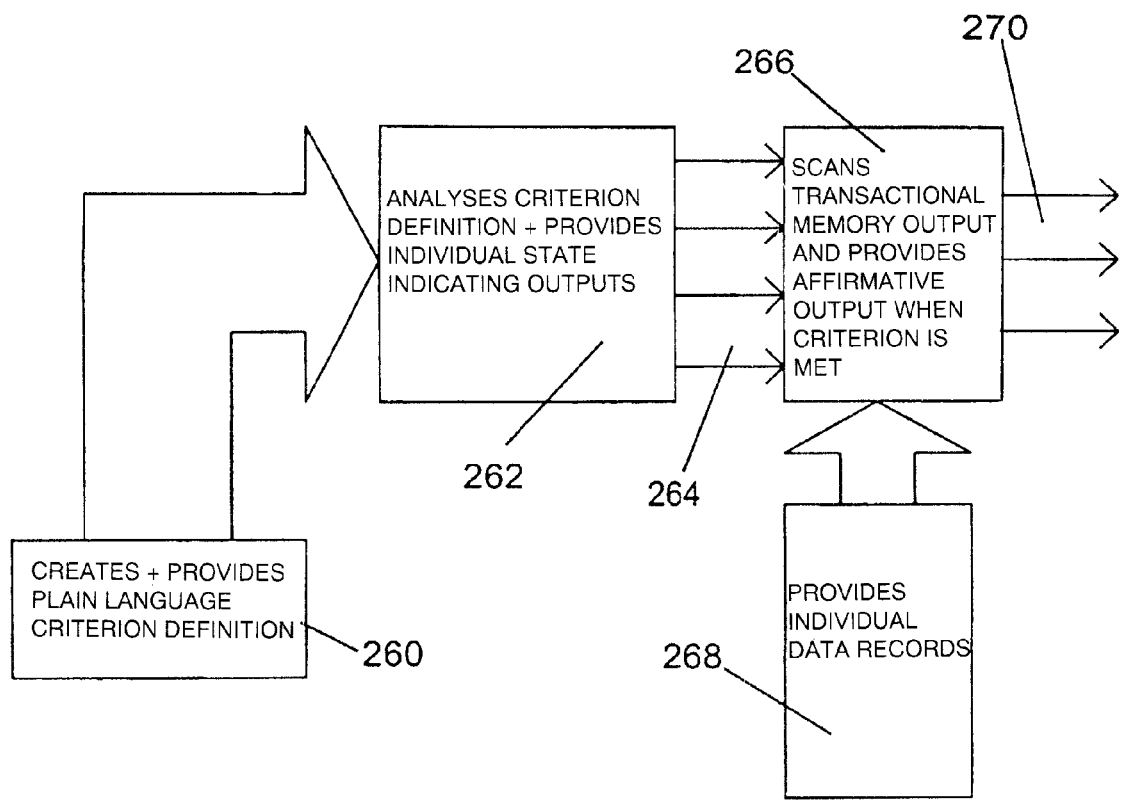
FIG. 13 shows a block diagram of one way in which the present invention can achieve a plain language definition for the criteria.

Attention is next drawn to FIG. 13 showing a block diagram of one way in which the present invention can achieve a plain language means for defining the conditions which are used, for example, in the thirty-seventh operation 204 and the thirty-eighth operation 206 to define how and when a certain fixed content entry will be selected for inclusion in the automatic response. FIG. 13 shows one type of conversion means.

In the fourth operation 66 and the sixth operation 72 otherwise shown in FIG. 2, the compiler of the automated response template defines a criterion. FIG. 13 shows one way in which the criterion can be defined in plain language.

The compiler of the automated response template loads a boolean or otherwise coded language statement into a criterion register 260 which creates and provides a plain language criterion definition, by means of syntactic interpretation and word selection and addition logic, for display to the human user, and also provides the basic definition to linguistic interpretation logic 262 which can take the form of either hard wired logic or an interpretational computer program. The linguistic interpretation logic analyses the basic criterion definition and provides individual state indicating output 264 to memory scanning logic 266 which scans the output of the transactional memory 268 where data from the data store 10 was placed in the twenty-first operation 134 and from which individual data records are extracted during automatic response. The memory scanning logic provides affirmative output 270 whenever a criterion is met and the affirmative outputs 270 are employed to select the appropriate fixed content entry in the formulation of the automatic response.

As just one example of how a criterion definition can be made, the compiler uses a graphical point and click method to create basic criterion definitions. These basic criterion definitions are then stored in JAVA (™) or other appropriate computer format. When the basic criterion definitions are re-displayed to the compiler, they are enhanced as plain text and shown in a plain text manner.

FIG. 13 shows just one method and one layout which can be used to achieve the creation, turning into plain language, analysis and application of criterion definitions. The present invention encompasses any other method whereby basic and plain language definitions of a criterion can be interpreted and used to select the activation of a response determined by the definition of the criterion.

Figure 14:
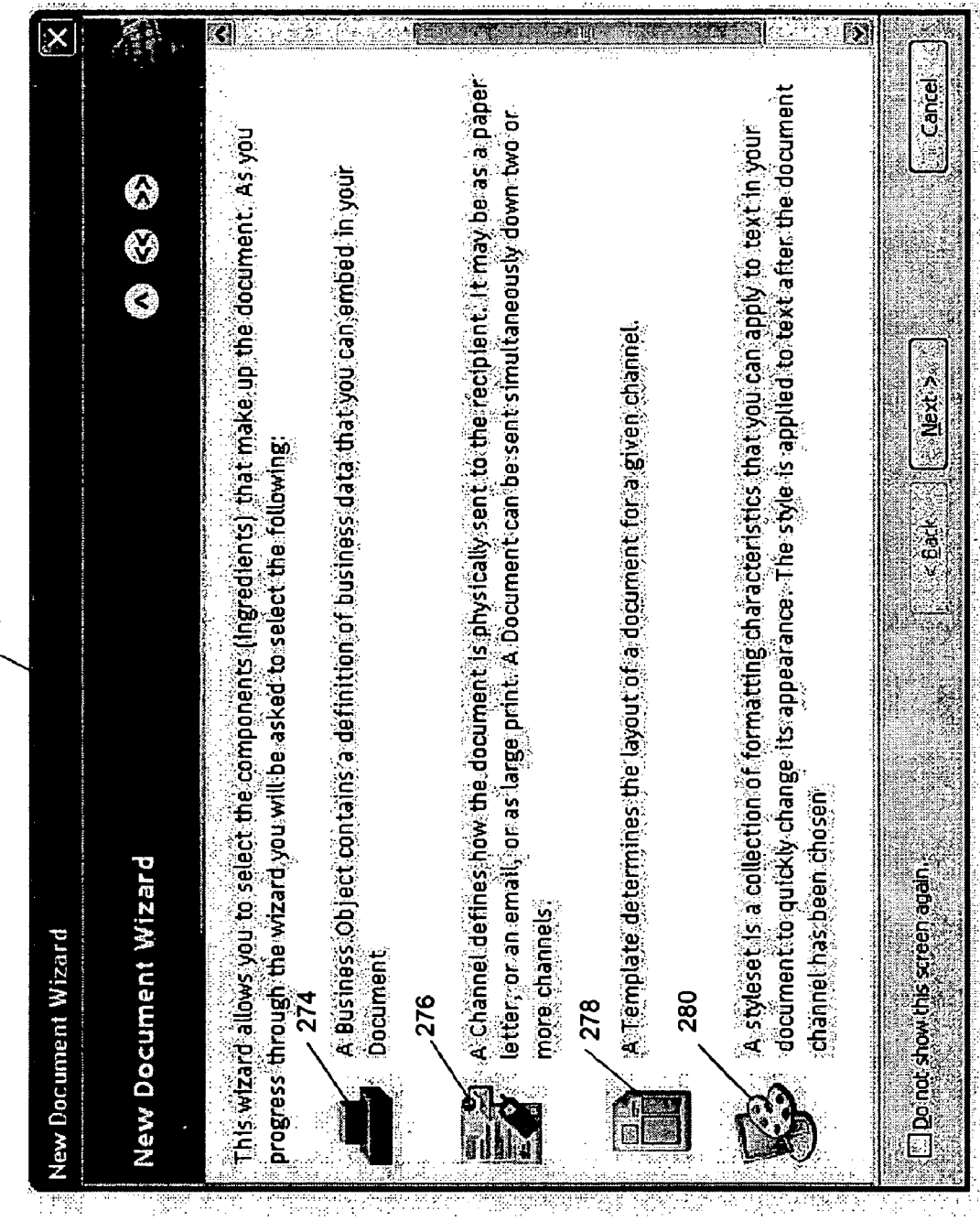
FIG. 14 shows a first screen which is presented to the human response compiler when the compiler is engaged in preparation of a response template.

Attention is next drawn to FIG. 14 which shows a first screen 272 presented to the compiler when the compiler is engaged in the sixteenth operation 116 shown in FIG. 5 where a response template is being prepared.

The first screen 272 commences by defining different terms used in the construction of an automated response. A first term 274 defines a business object. A business object is earlier described with regard to the fifth test 104, the sixth test 106 and the fifteenth operation 108 in FIG. 4. A business object is the definition of the data which is to be inserted into a fixed response element for inclusion in the automated response.

A second term 276 defines a channel. A channel is any one of the many possible means of communication shown as items 12', 18', 22', 52 in FIG. 1 and otherwise referred to with regard to the eighth operation 80 and twelfth operation 96 in FIG. 3 and as the twelfth 156 to eighteenth 180 tests in FIG. 8.

A third term 278 defines a layout template. A layout template defines one or more place holders for content for a specific medium. For example, a "print" layout template can have a placeholder for a logo and address in the top right hand corner of the sheet and another placeholder for the body of the text. As another example, an "Internet" layout template can comprise might have only one placeholder, that being for the body of the text, because the logo appears as part of the web page. A layout template can also comprise static objects or static text.

Contrast the Layout template 278 with the automated response template is described in preparation in FIG. 2, FIG. 3, FIG. 4, and FIG. 5. An automated response template is described in use in the twenty-fourth operation 146 in FIG. 7 and thereafter in FIG. 8, FIG. 9, FIG. 10, FIG. 11 and FIG. 12.

A fourth term 280 defines a styleset. A styleset is the collection of available options and insertions which can be used in a template. Elements of a styleset are earlier referred to with regard to the second operation 62 of FIG. 2 where fixed objects including letterheads and so on are selected, with regard to the third operation 64 of FIG. 2 where invariate objects or text can be inserted, with regard to the ninth operation 82 and the eleventh operation 94 of FIG. 3 where different idioms are usable in the automated response template, and with regard to the twenty-first test 196 and the thirty-fifth operation 198 of FIG. 9.

Figure 15:
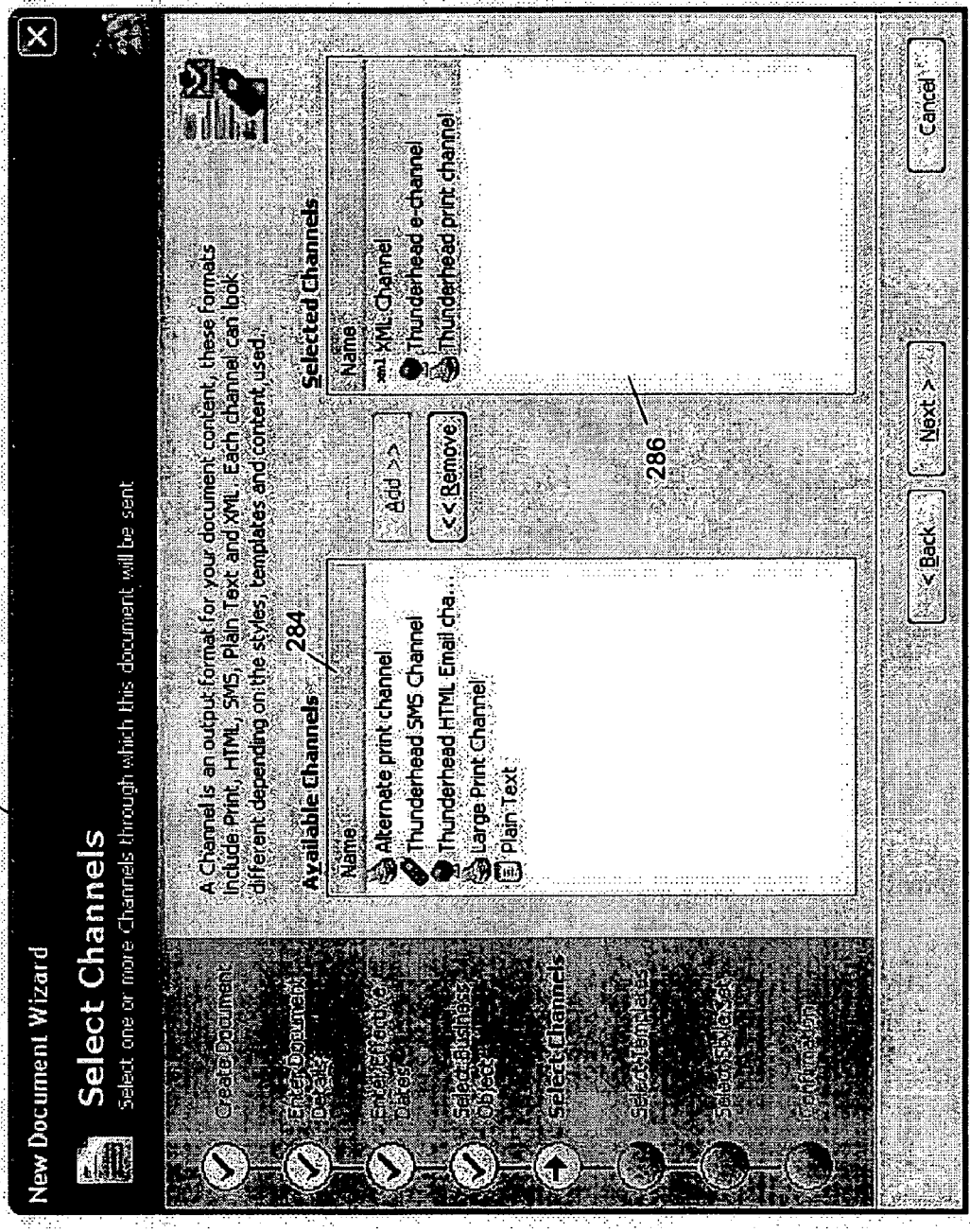
FIG. 15 shows a second screen presented to the compiler as the compiler prepares an automated response template.

Attention is next drawn to FIG. 15 showing a second screen 282 presented to the compiler as the compiler prepares an automated response template.

The second screen 282 comprises a left hand column 284 providing a list of available channels 12', 18', 22', 52 which can be selected in use in the automated response template being prepared. The second screen 282 also provides a right hand column 286 which lists the different channels 12', 18', 22', 52 which the compiler has selected to be used with the automated response template being prepared. The compiler selects an item from the left hand column 284 and transfers it to the right hand column 286 if it is to be used. If an item has erroneously been transferred to the right hand column 286, it can be transferred back to the left hand column 284.

Figure 16:
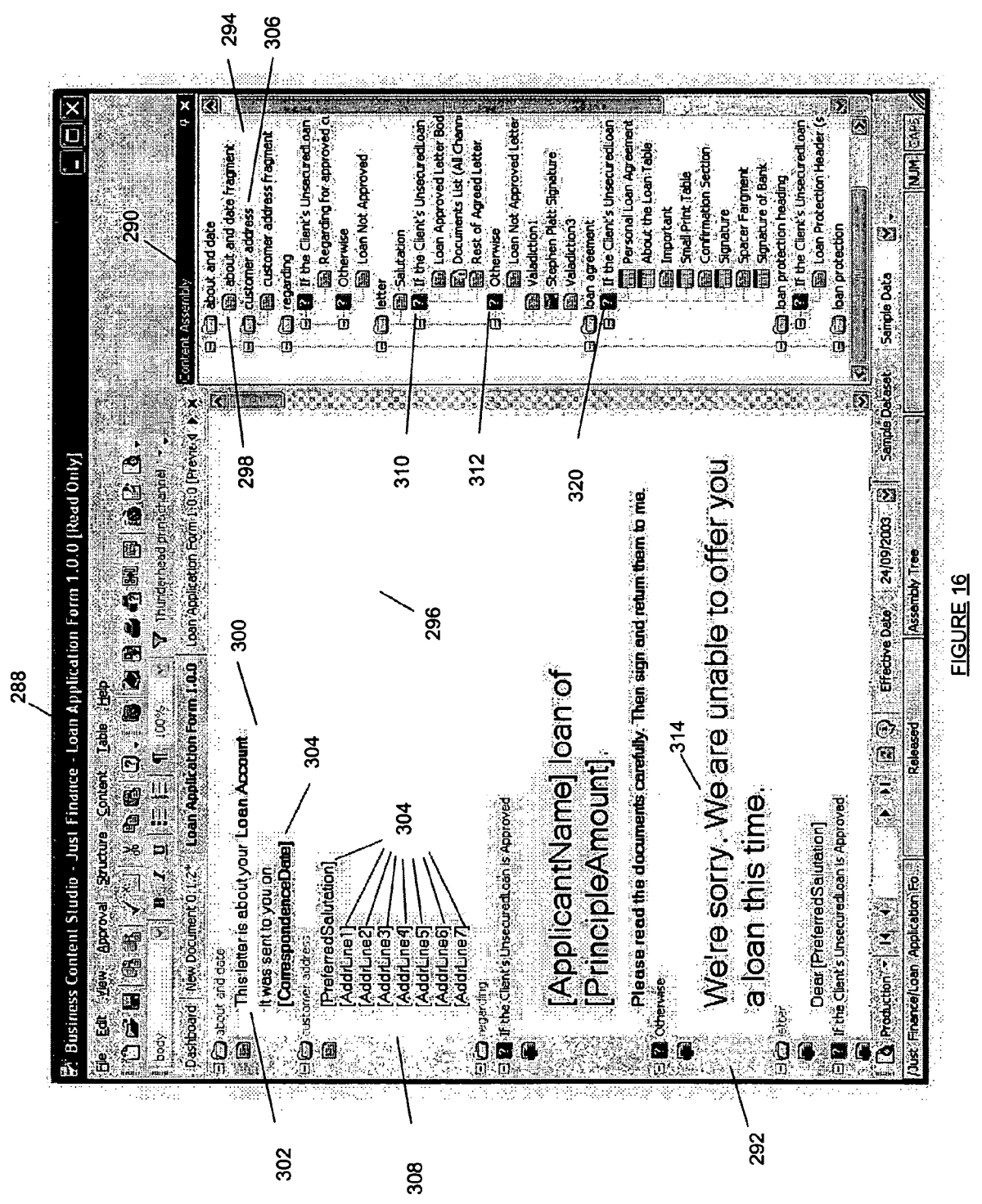

Attention is next drawn to FIG. 16 showing a third screen 288 presented to the compiler of the automated response template as the compiler prepares the automated response template.

The third screen 288 presents, to the compiler, a right hand response column 290 and a left hand response column 292.

The right hand response column 290 comprises a content assembly table 294 and the left hand response column 292 contains an exploded detail table 296 showing the fine structure of the elements otherwise disposed in the content assembly table 294.

A first example of an entry in the content assembly table 294 is the "about and correspondence date" entry 298 which is mirrored in the exploded detail table 296 as the exploded "about and correspondence date" entry 300 which contain a fixed element text item 302 which can be amended by the compiler. The fixed text entry is hereinbefore referred to with regard to the fifth operation 68 of FIG. 2 and the fourteenth operation 102 of FIG. 4.

Together with the fixed text entry 302, there is also provided a data insertion definition 304 where an item of data for insertion as described with reference to the fifth test 104 and the fifteenth operation 108 of FIG. 4 is defined by the words enclosed in the bracket and, when the automated response is run, is collected from the data memory 10 via the transaction member 268 to be inserted in the document or response.

In the right hand response column 290 a "customer address" entry appears correspondingly in the left hand response column 292 as an exploded "customer address" entry 308 which comprises further data insertion definitions 304', this time including detail of the preferred salutation and the address lines for that particular automated response recipient.

In the example given, in the right hand response column 290 is a criterion definition 310 referring, in this instance, to "if the client's loan application is approved". The criterion definition relates to the inclusion of criteria referred to with regard to the fourth operation 66, the fifth operation 68, the first test 70 and the sixth operation 72.

Further down on the right hand response column 290 there is an "otherwise" 312 criterion, linked to the criterion definition 310 which defines what is to be done if the criterion definition 310 is not met.

Returning to the left hand response column 292, we are able to see the exploded "otherwise" criterion response text 314.

The right hand response column 290 has the content assembly table 294 organised in a tree structure, readily understood within the usage of computers. The right hand response column 292 has the items in the left hand response column 290 displayed in exploded form and readily accessible to the compiler.

Figure 17:
FIG. 17 shows, by way of an example, a fourth screen which would be presented to the compiler during, for example, testing of the response template.

Attention is next drawn to FIG. 17 which shows, by way of an example, a fourth screen 316 which would be presented to the compiler during, for example, testing of the response template according to the seventeenth operation 118 of FIG. 5.

Testing of a response template is achieved by activating the compiled response template, and providing various different data to the response template to see how the response template reacts. If the response template provides an unacceptable response in any instance, the complier can return to the third screen 288 to modify the specification of the automated response. The re-specified automated response can then be re-tested.

All of the elements of FIG. 16 have been incorporated into a response letter 318 in this instance offering a loan that has been applied for under the circumstance that the criterion definition 310 has been met. Attention is next drawn to FIG. 18 which shows further material which is added if a further criterion definition 320 is met.

The criterion definitions 310, 314, 320 can also include statements concerning idioms, language and so on.

Reference is made to our copending applications titled: "Method and System for Automatic Modifiable Messages" and "Automatic Communication Method and System" filed on even date herewith, the disclosures of which are incorporated herein by reference.

The invention claimed is:

1. A graphical user interface for use in preparation of an automatically generated communication in response to an event requiring generation of a communication, said communication being generated from a response template which contains data definitions and conditional criteria and wherein conditional criterion in the response template automatically activates alternative selections of text and data according to whether the criterion is met and whether the criterion is not met; said graphical user interface comprising:
   means for presenting an image of a list of at least one selectable operational options;
   means for accepting selection of an operational option from the list; and
   means for presenting an image of said at least one operational option selected as a chosen option list,
   said list of said at least one selectable operational option comprises a list of a plurality of different media by which the automatically generated communication can be transmitted; and
   wherein said list of chosen options comprises at least one chosen media for transmission of the automatically generated communication; and
   wherein the text and data content of the automatically generated communication comprises at least one of an instruction to the recipient for handling a response to the communication and an indication of a medium of an associated communication, which at least one instruction and indication is automatically changed depending on the characteristic of the chosen media so that differences in such at least one instruction and indication between communications are identifiable by the recipient of a communication.

2. A graphical user interface, according to claim 1, further comprising: means for selecting a chosen option from the chosen option list; and means for accepting return of a selected chosen option to the list of selectable operational options.

3. A graphical user interface, according to claim 1, wherein said means for presenting an image of a list of at least one selectable operational option and said means for presenting an image of said at least one operational option as a chosen option list together comprise a split screen, said split screen having a first portion and a second portion and being operative to display said list of said at least one selectable operational option in said first portion and to display said chosen option list in said second portion thereof.

4. A graphical user interface, according to claim 3, wherein said split screen has a first side and a second side and said first portion of said split screen is on said first side and wherein said second portion of said split screen is on said second side.

5. A graphical user interface, according to claim 3, wherein said split screen is one of a plurality of split screens.

6. A graphical user interface, according to claim 1, wherein said list of said at least one selectable operational option is presented as a tree structure.

7. A graphical user interface, according claim 1, wherein said graphical user interface comprises means for accepting selection of said at least one chosen media and means for directing the automatically generated communication for transmission on said at least one chosen media selected.

8. A graphical user interface, according to claim 1, wherein said list of said at least one selectable operational option comprises at least one of: at least one criteria to be fulfilled to cause generation of the automatically generated communication; at least one text item; at least one criteria to be fulfilled to select a text item; and at least one fixed item to be selected.

9. A graphical user interface, according to claim 8, comprising conversion means for accepting a criterion definition for each of said at least one criteria and for converting the criterion definition into plain language for display.

10. A graphical user interface, according to claim 8 wherein said at least one text item comprises items in a plurality of selectable languages.

11. A graphical user interface, according to claim 10, wherein said at least one text item comprises items for use in at least one selectable idioms.

12. A graphical user interface, according to claim 11, wherein said at least one text items comprises items for use in at least one selectable media.

13. A graphical user interface, according to claim 12, wherein said at least one fixed item comprises at least one selectable place holder for use with at least one media.

14. A graphical user interface, according to claim 13, wherein said at least one fixed item comprises at least one selectable place holder for use in fixing the position of items with at least one media.

15. A graphical user interface, according to claim 14, wherein said at least one fixed item comprises at least one selectable item for use with at least one media.

16. A graphical user interface, according to claim 15, comprising means for testing a specified automatically generated communication by presenting different criteria for generation of an automatically generated communication, and means for altering a specification of the automatically generated communication until a user approved automatically generated communications are obtained.

17. A method for preparing an automatically generated communication in response to an event requiring generation of a communication, the method comprising the steps of:
   presenting an image of a list of at least one selectable operational option;
   selecting at least one operational option from the list;
   accepting said at least one operational option selected;
   presenting an image of said at least one operational option selected as a chosen option list;
   subsequently generating an automatically generated communication which implements said at least one chosen option listed;
   wherein the step of generating a communication comprises reading a response template which contains data definitions and conditional criteria and wherein conditional criterion in the response template automatically activates alternative selections of text and data according to whether the criterion is met and whether the criterion is not met;

said list of said at least one selectable operational option comprises a list of a plurality of different media by which the automatically generated communication can be transmitted; and wherein said list of chosen options comprises at least one chosen media for transmission of the automatically generated communication and wherein the text and data content of the automatically generated communication comprises at least one of an instruction to the recipient for handling a response to the communication and an indication of a medium of an associated communication, which at least one instruction and indication is automatically changed depending on the characteristic of the chosen medium so that differences in such at least one instruction and indication between communications are identifiable by the recipient of a communication.

18. A method, according to claim 17, comprising the steps of selecting a chosen option from the chosen option list; and accepting return of the chosen option selected to said list of at least one selectable operational option.

19. A method, according to claim 18 comprising the steps of providing a split screen with a first portion and a second portion; presenting, simultaneously, an image of a list of said least one selectable operational option in the first portion thereof and an image of said chosen option list in the second portion thereof.

20. A method, according to claim 19, comprising the steps of providing said first portion of said split screen on a first side thereof and providing said second portion of said split screen on a second side thereof.

21. A method, according to claim 20 wherein said split screen is one of a plurality of split screens.

22. A method, according to claim 20, comprising the step of presenting said list of at said least one selectable operational option as a tree structure.

23. A method, according to claim 20, comprising the steps of: accepting selection of said at least one chosen medium; and subsequently directing the automatically generated communication for transmission on said at least one chosen medium.

24. A method, according to claim 20, wherein said list of said at least one selectable operational option comprises at least one of: at least one criterion to be fulfilled to cause the generation of the automatically generated communication; at least one criterion to be fulfilled to select a text item; at least one text item to be selected; and at least one fixed item to be selected.

25. A method, according to claim 24, comprising the steps of: accepting a criterion definition for each of said at least one criterion and converting the criterion definition into plain language for display.

26. A method, according to claim 24 or claim 25, wherein said at least one text item comprises items in a plurality of selectable languages.

27. A method, according to claim 24 or claim 25, wherein said at least one text item comprises items for at least one selectable idiom.

28. A method, according to claim 24 or claim 25, wherein said at least one text item comprises items for at least one selectable media.

29. A method, according to claim 24 or claim 25, wherein said at least one fixed item comprises at least one selectable place holder for at least one media.

30. A method, according to claim 24 or 25, wherein said at least one fixed item comprises at least one selectable place holder for fixing the position of items with at least one media.

31. A method, according to claim 24 or 25, wherein said at least one fixed item comprises at least one selectable item for at least one media.

32. A method, according to claim 24 or 25, comprising the steps of: testing a specified automatically generated communication by presenting different criteria for generation of an automatically generated communication thereto; and altering the specification of the automatically generated communication until a user approved automatically generated communication is obtained.

33. A graphical user interface, according to any one of claims 1 to 16, further comprising means to implement the chosen options in subsequent generation of the automatically generated communication.

34. A graphical user interface for use in preparation of an automatically generated communication in response to an event requiring generation of a communication, said graphical user interface comprising:

means for presenting an image of a list of at least one selectable operational option comprising at least one of: at least one criteria to be fulfilled to cause generation of the automatically generated communication; at least one text item comprising items in a plurality of selectable languages, items for use in at least one selectable idiom and items for use in at least one selectable medium; at least one criteria to be fulfilled to select a text item; and at least one fixed item to be selected comprising at least one selectable place holder for use with at least one medium, at least one selectable place holder for fixing the position of items with at least one medium and at least one selectable item for use with at least one medium;

conversion means for accepting a criterion definition for each of said at least one criteria and for converting the criterion definition into plain language for display;

means for accepting selection of an operational option for use;

means for presenting an image of said at least one operational option selected as a chosen option list.

means for selecting a chosen option on the chosen option list;

and means for accepting return of a selected chosen option to the list of selectable operational options, wherein:

said means for presenting an image of a list of at least one selectable operational option and said means for presenting an image of said at least one operational option as a chosen option list together comprise a screen split into a first side and a second side and being operative to display said list of said at least one selectable operational option as a tree structure in said first side and to display said chosen option list in said second side thereof;

said list of said at least one selectable operational option comprises a list of a plurality of different media by which the automatically generated communication can be transmitted;

said list of chosen options comprises at least one chosen media for transmission of the automatically generated communication;

said graphical user interface comprises means for accepting selection of said at least one chosen media and means for directing the automatically generated communication for transmission on said at least one chosen media selected and wherein the text and data content of the automatically generated communication comprises at least one of an instruction to the recipient for handling a response to the communication and an indication of a medium of an associated communication, which at least one instruction and indication is automatically changed depending on the characteristic of the chosen medium so that differences in such at least one instruction and indication between communications are identifiable by the recipient of a communication.

35. A graphical user interface, according to claim 34, comprising means for testing a specified automatically generated communication by presenting different criteria for generation of an automatically generated communication, and means for altering a specification of the automatically generated communication until a satisfactory automatically generated communications are obtained.

36. A graphical user interface, according to claim 34, wherein said at least one instruction and indication concerns a document associated with the communication.

* * * * *